Patented Mar. 11, 1952

2,589,162

UNITED STATES PATENT OFFICE 2,589,162

HERBICIDE

Jack P. Taylor, Arlington, Va., assignor to The R. H. Bogle Company, Alexandria, Va., a corporation of Delaware No Drawing. Application April 27, 1950, Serial No. 158,597

9 Claims. (Cl. 71—2.4)

This invention relates to new and improved herbicides and methods for destroying undesirable grasses and weeds. More particularly the invention relates to herbicides which comprise mixtures of chlorate and trichloroacetate salts.

The alkali metal chlorate salts, as for example, sodium chlorate and potassium chlorate and the salts of trichloroacetic acid, as for example, sodium, potassium and ammonium trichloroacetate, are well known for their herbicidal action. However, both types of compounds are selective. The chlorates are effective against shallow rooted weeds but relatively ineffective against many grasses, particularly Bermuda grass, nut grass and crab grass, and for an adequate kill, very large quantities are required. The chlorates possess the additional disadvantage of constituting a fire hazard, and, therefore, requiring such expensive precautions as the incorporation of considerable quantities of a hygroscopic material, such as calcium chloride.

The trichloroacetates are relatively ineffective against weeds, and from poor to fair against grasses. On a pound for pound basis, they are somewhat more effective than the chlorates against grasses, particularly Bermuda grass. However, since the trichloroacetates are considerably more expensive than the chlorates, this advantage is largely cancelled out for economic reasons. The quantities of either type of compound required for an adequate over-all kill are so high as to make the cost prohibitive in many cases.

Another disadvantage of both the chlorates and the trichloroacetates, particularly the latter, is their slowness of action. Several weeks are often necessary for substantial effect.

In many cases, as for example along railroad rights-of-way, it is essential that substantially all weeds and grasses be destroyed without substantial regrowth for extended periods. The more rapid and the higher the percentage of kill, the more retarded is regrowth. The cost of chemical herbicidal treatment must compare favorably with mechanical methods.

The object of this invention is to provide herbicidal compositions which are rapidly and highly effective, not only against weeds, but also against such resistant grasses as Bermuda, Johnson, nut and crab.

Still another object is to provide herbicidal compositions which comprise mixtures of herbicidal compounds and which are considerably more effective both in terms of rapidity of action and total kill, particularly against grasses and also against weeds than would be expected from the activity of the individual components.

A further object is to provide improved methods for destroying undesirable grasses and weeds.

Still further objects and advantages will more particularly appear from the following description.

I have discovered that an unexpectedly high kill, particularly of grasses and especially of Bermuda grass which is quite prevalent and highly resistant, is obtained with a mixture of a chlorate and a trichloroacetate salt, as for example, a mixture of sodium chlorate and sodium trichloroacetate. In general, the percentage of kill is considerably greater than that obtained with either of the components used individually in twice the amount employed in the mixture. Furthermore, the percentage kill of the more resistant types of grasses, is higher than the combined kill obtained when the components are applied separately in the same concentration employed in the mixture. The mixture also acts much more quickly than either of the components, accomplishing a substantial kill within one week of application. The effects of the mixture are very prolonged, a single application being sufficient to control the vegetation for an entire growing season, whereas either component applied individually in the concentration used in the mixture requires a second application for effective control.

There is apparently a synergistic interaction of the herbicidal components which permits the use of reduced amounts to obtain the desired kill. In addition to reducing costs while at the same time increasing efficacy, the disadvantages attending the use of large amounts of the herbicidal components, such as soil sterilization, fire hazards, and the like, are greatly minimized.

Another important advantage of my new compositions is the fact that non-herbicidal, hygroscopic materials, such as calcium chloride, which are ordinarily essential to reduce the fire hazards accompanying the use of chlorate salts, may be entirely dispensed with. The trichloroacetate salts, such as sodium trichloroacetate, are sufficiently hygroscopic to make the addition of other hygroscopic materials unnecessary.

To determine the comparative efficacy of my new herbicidal compositions and of each of the components, numerous tests were conducted under actual conditions of use. Each of the formulae was tested in five widely separated localities, and in some cases in six, including Florida, Georgia, Alabama, South Carolina, Virginia and Tennessee. The total area covered in each test comprised a quarter mile strip, twenty feet wide, along a railroad right-of-way, namely about 26,600 square feet. Each of these test areas was treated with about 100 gallons of solution containing a measured quantity of the particular heribicide formula being tested.

The percentage kill of Bermuda grass as given in Table I, is an over-all average of the results obtained during several series of tests conducted in different geographic localities in late spring and early summer. Each formula was tested in each of five localities, and some in a sixth. The kill of Bermuda grass was tabulated only for the quarter mile test strips where it was found in sufficiently large quantities to give valid results. The percentage kill in every case is the average of from 3 to 9 separate tests.

TABLE I

*Bermuda grass*

| Formula | Amount by Weight[1] | Percentage Kill[2] | |
|---|---|---|---|
| | | 1 week | 4 weeks |
| | Lbs. | | |
| Sodium Chlorate | 37.5 | 20 | 2 |
| Calcium Chloride | 28.1 | | |
| Sodium Chlorate | 56.3 | 20 | 22 |
| Calcium Chloride | 42.2 | | |
| Sodium Chlorate | 112.5 | 53 | 54 |
| Calcium Chloride | 84.4 | | |
| Sodium Trichloroacetate | 15 | 16 | 59 |
| Sodium Trichloroacetate | 30 | 36 | 83 |
| Sodium Chlorate | 50 | 70 | 88 |
| Sodium Trichloroacetate | 15 | | |

[1] Amount applied in aqueous solution to ¼ mile stretch of railroad right-of-way 20 feet wide.
[2] Percentage of Bermuda grass originally present which was dead or brown at time of observation.

Table II sets out comparative results obtained in given geographical locations.

TABLE II

*Bermuda grass*

| Composition | Amount by Weight[1] | Location C—Percentage kill[2] | | Location D—Percentage kill[2] | |
|---|---|---|---|---|---|
| | | 1 week | 4 weeks | 1 week | 4 weeks |
| | Lbs. | | | | |
| Sodium Chlorate | 56.3 | | | 0 | 0 |
| Calcium Chloride | 42.2 | | | | |
| Sodium Chlorate | 112.5 | 45 | 40 | 60 | 57 |
| Calcium Chloride | 84.4 | | | | |
| Sodium Trichloroacetate | 15 | 10 | 60 | 10 | 60 |
| Sodium Trichloroacetate | 30 | 20 | 80 | 10 | 80 |
| Sodium Chlorate | 50 | 70 | 90 | 85 | 85 |
| Sodium Trichloroacetate | 15 | | | | |

[1] Amount applied in aqueous solution to one quarter mile stretch of railroad right-of-way 20 feet wide.
[2] Percentage of Bermuda grass originally present which was dead or brown at time of observation.

Percentage kill as given in Table III is an over-all average of the results obtained during several series of tests conducted in different geographical locations in late spring and early summer. Each formula was tested in each of five localities and some in a sixth. Since not all of the quarter mile test strips contained significant amounts of Johnson grass, not every test strip is represented in the given average. However, the given percentage kill is the average of at least two separate tests and as many as four.

TABLE III

*Johnson grass*

| Composition | Amount by Weight[1] | Percentage Kill[2] | |
|---|---|---|---|
| | | 1 week | 4 weeks |
| | Lbs. | | |
| Sodium Chlorate | 56.3 | 20 | 43 |
| Calcium Chloride | 42.2 | | |
| Sodium Chlorate | 112.5 | 45 | 76 |
| Calcium Chloride | 84.4 | | |
| Sodium Trichloroacetate | 15 | 18 | 53 |
| Sodium Trichloroacetate | 30 | 23 | 67 |
| Sodium Chlorate | 50 | 50 | 85 |
| Sodium Trichloroacetate | 15 | | |

[1] Amount applied in aqueous solution to one quarter mile stretch of railroad right-of-way 20 feet wide.
[2] Percentage of Johnson grass originally present which was dead or brown at time of observation.

Tables IV and V give the results of tests conducted in different geographical localities during late spring, early summer and late summer. Each formula was tested in each of five localities. A sixth locality was tested in early and late summer. Weeds were found in substantial amounts in most of the test areas. The kill percentages given in Table V were the over-all averages of at least five and as many as eleven tests. Crab grass, on the other hand, was considerably less prevalent. The kill figures in Table IV represent at least one and as many as four tests in areas having a sufficient abundance of crab grass for valid results.

TABLE IV

*Crab grass*

| Composition | Amount by Weight[1] | Percentage Kill[2] | |
|---|---|---|---|
| | | 1 week | 4 weeks |
| | Lbs. | | |
| Sodium Chlorate | 56.3 | 40 | 30 |
| Calcium Chloride | 42.2 | | |
| Sodium Chlorate | 112.5 | 63 | 55 |
| Calcium Chloride | 84.4 | | |
| Sodium Trichloroacetate | 15 | 10 | 30 |
| Sodium Trichloroacetate | 30 | 5 | 68 |
| Sodium Chlorate | 50 | 85 | 90 |
| Sodium Trichloroacetate | 15 | | |

[1] Amount applied in aqueous solution to ¼ mile stretch of railroad right-of-way 20 feet wide.
[2] Percentage of crab grass originally present which was dead or brown at time of observation.

TABLE V

*Weeds*

| Composition | Amount by weight[1] | Percentage kill[2] (4 weeks) |
|---|---|---|
| | Lbs. | |
| Sodium Chlorate | 56.3 | 79 |
| Calcium Chloride | 42.2 | |
| Sodium Chlorate | 112.5 | 99 |
| Calcium Chloride | 84.4 | |
| Sodium Trichloroacetate | 15 | 29 |
| Sodium Trichloroacetate | 30 | 47 |
| Sodium Chlorate | 50 | 95 |
| Sodium Trichloroacetate | 15 | |

[1] Amount applied in aqueous solution to ¼ mile stretch of railroad right-of-way 20 feet wide.
[2] Percentage of weeds originally present which were dead or brown at time of observation.

Although the above specific examples are illustrative with respect to the sodium salts, which are my preferred embodiment, it will be understood that other water soluble salts, as for example, the alkali metal and ammonium trichloroacetate salts and the alkali metal chlorate salts are also effective for my purpose. It will also be understood that the proportions may be varied to suit specific conditions.

Having thus described my invention, I claim:

1. A herbicidal composition comprising a mixture of an alkali metal chlorate and a water soluble salt of trichloroacetic acid, each of said components being present in less than half the amount required for an equivalent herbicidal effect when each of said components is used separately, said salt of trichloroacetic acid serving to reduce the fire hazards of the chlorate-containing composition.

2. A herbicidal composition comprising a mixture of an alkali metal chlorate and an alkali metal salt of trichloroacetic acid, each of said components being present in less than half the amount required for an equivalent herbicidal effect when each of said components is used separately, said alkali metal salt of trichloroacetic acid serving to reduce the fire hazards of the chlorate-containing composition.

3. A herbicidal composition comprising a mixture of about 50 parts by weight of sodium chlorate and about 15 parts by weight of sodium trichloroacetate.

4. A herbicidal composition comprising a mixture of sodium chlorate and sodium trichloroacetate, each of said components being present in less than half the amount required for an equivalent herbicidal effect when each of said components is used separately.

5. A herbicidal composition comprising a mixture of about 50 parts by weight of sodium chlorate and about 15 parts by weight of sodium trichloroacetate, each of said components being present in less than half the amount required for an equivalent herbicidal effect when each of said components is used separately.

6. A process for destroying grasses and weeds comprising contacting said vegetation with an aqueous solution containing an alkali metal chlorate and a water soluble salt of trichloroacetic acid, each of said salts being present in less than half the amount required for an equivalent herbicidal effect when each of said salts is used separately, said solution being applied in an amount and concentration sufficient to accomplish the desired herbicidal effect.

7. A process for destroying grasses and weeds comprising contacting said vegetation with an aqueous solution containing an alkali metal chlorate and an alkali metal salt of trichloroacetic acid, each of said salts being present in less than half the amount required for an equivalent herbicidal effect when each of said salts is used separately, said solution being applied in an amount and concentration sufficient to accomplish the desired herbicidal effect.

8. A process of destroying grasses and weeds comprising contacting said vegetation with an aqueous solution containing sodium chlorate and sodium trichloroacetate, each of said salts being present in less than half the amount required for an equivalent herbicidal effect when each of said salts is used separately, said solution being applied in an amount and concentration sufficient to accomplish the desired herbicidal effect.

9. A process of destroying grasses and other weeds comprising contacting said vegetation with an aqueous solution containing about 50 parts of sodium chlorate and about 15 parts of sodium trichloroacetate, said solution being applied in an amount sufficient to accomplish the desired herbicidal effect.

JACK P. TAYLOR.

REFERENCES CITED

The following references are of record in the file of this patent:

UNITED STATES PATENTS

| Number | Name | Date |
|---|---|---|
| 2,094,366 | Melhus | Sept. 28, 1937 |
| 2,393,086 | Bousquet | Jan. 15, 1946 |

FOREIGN PATENTS

| Number | Country | Date |
|---|---|---|
| 105,029 | Australia | Sept. 15, 1938 |